(12) United States Patent
Uebelhoer

(10) Patent No.: US 11,757,269 B2
(45) Date of Patent: Sep. 12, 2023

(54) ELECTRICAL JUNCTION BOX FOR INSTALLATION ON METAL ROOFS TO ACCOMMODATE INTERNAL WIRING OF SOLAR PANELS

(71) Applicant: Tyler Uebelhoer, Buffalo, NY (US)

(72) Inventor: Tyler Uebelhoer, Buffalo, NY (US)

( * ) Notice: Subject to any disclaimer, the term of this patent is extended or adjusted under 35 U.S.C. 154(b) by 54 days.

(21) Appl. No.: 17/161,071

(22) Filed: Jan. 28, 2021

(65) Prior Publication Data

US 2022/0239082 A1 Jul. 28, 2022

(51) Int. Cl.
*H02G 3/08* (2006.01)
*H02S 40/34* (2014.01)

(52) U.S. Cl.
CPC ............ *H02G 3/081* (2013.01); *H02G 3/088* (2013.01); *H02S 40/34* (2014.12)

(58) Field of Classification Search
CPC ......... H02G 3/081; H02G 3/088; H02S 40/34
USPC .......................................................... 220/3.8
See application file for complete search history.

(56) References Cited

U.S. PATENT DOCUMENTS

| | | |
|---|---|---|
| 3,701,448 A | 10/1972 | Vadnais |
| 4,328,903 A | 5/1982 | Baars |
| 4,408,695 A * | 10/1983 | Balkwill ................ H02G 3/088 174/57 |
| 4,623,753 A | 11/1986 | Feldman |
| 5,913,439 A * | 6/1999 | Von Arx ................ H02G 3/121 220/4.03 |
| 7,674,974 B1 * | 3/2010 | Shotey ................... H02G 3/123 174/53 |
| 9,496,697 B1 | 11/2016 | Wentworth |
| 9,887,666 B2 | 2/2018 | Duan |
| 10,218,308 B2 | 2/2019 | Ko |
| 10,476,429 B2 | 11/2019 | Mostoller |
| 10,505,354 B2 | 12/2019 | Wade |
| 10,554,029 B2 | 2/2020 | Hannum |
| 10,594,121 B2 | 3/2020 | Yang |
| 11,075,509 B2 * | 7/2021 | Hughey ................... H02G 3/12 |
| 2017/0338635 A1 * | 11/2017 | Stahl, II ................... H05K 3/38 |
| 2017/0346269 A1 * | 11/2017 | Isaacson ................ B28B 23/02 |
| 2020/0119533 A1 * | 4/2020 | Wade ...................... H02G 3/088 |
| 2022/0085585 A1 * | 3/2022 | Wade ...................... H02G 3/12 |

FOREIGN PATENT DOCUMENTS

| | | | | |
|---|---|---|---|---|
| CA | 2745940 A1 * | 4/2012 | ............ | F16B 43/001 |
| CA | 2821226 A1 * | 1/2014 | ............ | H02G 3/088 |
| CN | 203522633 U | 2/2014 | | |
| WO | WO-2012160723 A1 * | 11/2012 | ......... | B60R 16/0222 |

* cited by examiner

*Primary Examiner* — J. Gregory Pickett
*Assistant Examiner* — Niki M Eloshway
(74) *Attorney, Agent, or Firm* — Simpson & Simpson, PLLC

(57) ABSTRACT

A junction box, comprising a housing having an open top and a closed bottom, a cover, arranged to secure to the open top of the housing, a flexible casing having four side members arranged to sealably surround the housing, an outwardly extending shelf fixedly secured to an outside surface of the four side members of the flexible casing, and, a flexible rim fixedly secured to a top surface of the shelf forming a pair of oppositely arranged V-shaped channels on a bottom surface of the shelf.

14 Claims, 6 Drawing Sheets

ELECTRICAL JUNCTION BOX FOR INSTALLATION ON METAL ROOFS TO ACCOMMODATE INTERNAL WIRING OF SOLAR PANELS

FIELD

The present invention relates generally to a junction box that is arranged to sit flush atop a seem or gap created by roofing shingles or roofing panels that is weatherproof and sealed from the outside environment.

BACKGROUND

Junction boxes are well known in the art. The first sealed junction boxes or wet room boxes were commercially available beginning in the 1920s. Kaiser and Spelsberg began their cast iron junction box commercial line in 1926, being one of the first companies to make the junction box commercially available. Since that time, junction boxes have taken various forms. changing from metal to plastic materials, along with the location physical junction boxes were needed, such as on roofs, external structural walls, etc.

In response to the 1970s energy crisis, the U.S. Congress passed the Solar Energy Research, Development and Demonstration Act of 1974 which spurred the beginning of residential solar power options that were previously only widely available for commercial developments. In 2006, the U.S. enacted the Solar Investment Tax Credit that kick-started an annual growth rate of fifty percent of solar energy use in the last ten years. With the financial incentives in place, the necessary supporting components for installation began being developed.

U.S. Pat. No. 3,701,448 describes an electrical junction box arranged to house electrical components on a roof and is further arranged to be mounted on the underside of roofing panels via an integral groove having tabs that frictionally engage a ridge underside the roofing panels. The junction box also threadably secures to the underside ridge and when fully installed, is in an upside-down configuration.

U.S. Pat. No. 10,505,354 discloses an electrical junction box having an integral flashing. The flashing is arranged to be fixed to an external surface on a structure via an adhesive. The junction box also comprises a closed bottom and an open top. The open top is sealed from external weather by a threadably secured cover.

Thus there is a long-felt need for a junction box that is weather resistant and has a means of resting flush atop a roof where there may be seams or gaps between roofing shingles or roofing panels, while preventing water or rain from entering the junction box or a through-bore in the roof where electrical conduit passes through.

SUMMARY

A junction box, comprising, a housing having an open top and a closed bottom, a cover, arranged to secure to the open top of the housing, a flexible casing having four side members arranged to sealably surround the housing, an outwardly extending shelf fixedly secured to an outside surface of the four side members of the flexible casing, and, a flexible rim fixedly secured to a top surface of the shelf forming a pair of oppositely arranged V-shaped channels on a bottom surface of the shelf.

The present invention also generally comprises a junction box, comprising, a housing having an open top and a closed bottom, a cover, arranged to secure to the open top of the housing, and, a flexible casing having four side members arranged to sealably surround the housing, the flexible casing further comprising an outwardly extending shelf, the shelf comprising an embedded flexible, deformable member.

A general object to this invention is to provide a junction box that is arranged to rest flush atop a seam or gap of a roof, e.g., shingles or metal roof panels.

Another object of the present invention is to provide a junction box that is water-tight and weatherproof to protect internal electrical components.

A further object of the present invention is to provide a junction box that includes a flexible outer shelf that is mailable to provide a flush contact with a roof top having a variety of external features, e.g., seams between shingles or metal roof panels, or other components such as an electrical wire, or an irregular shaped roofing section.

This and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring,"

"immediate," "adjoining," etc., and such terms may be used interchangeably as appearing in the specification and claims.

Figure 1:
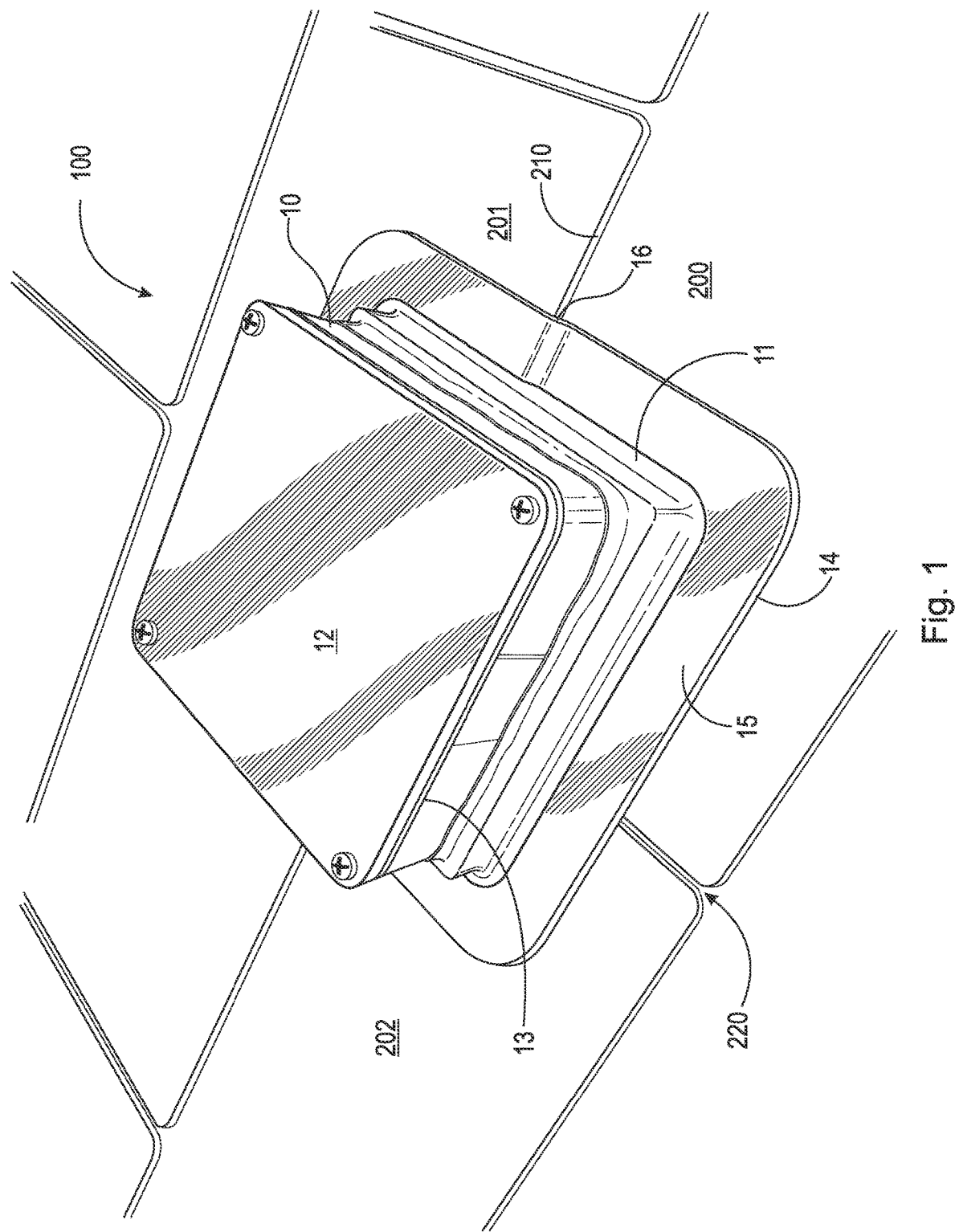
FIG. 1 is a front perspective view of the present invention shown installed atop a shingled roof.

Adverting now to the figures, FIG. 1 is a perspective view of a first embodiment of the present invention in an installed configuration. Junction box 100 is shown in FIG. 1 affixed to roof shingles 200, 201, and 202. It should be appreciated that, although junction box 100 is shown affixed to roofing shingles, it may also be fixed to metal roof panels, or to siding panels on the external walls of a structure. Junction box 100, in a preferred embodiment, generally comprises four (4) components: housing 10, flexible casing 11, cover 12, and seal 13 of cover 12. Flexible casing 11 further comprises extended shelf 14 and flexible rim 15. Flexible casing 11 and flexible rim 14 are preferably made of any suitable flexible material such as rubber. Extended shelf 14 extends from the lower external walls of flexible casing 11 and, in a preferred embodiment, is a singular piece. Flexible rim 15 is fixed to an upper surface of extended shelf 14 and may be comprised of any suitable malleable material, such as but not limited to aluminum. Housing 10 is arranged to accept necessary electrical components to support roof accessories, such as solar panels.

As illustrated in FIG. 1, extended shelf 14 of flexible casing 11 is arranged to rest atop a roof, and in a preferred embodiment, specifically arranged to rest directly on a seam or gap between shingles, roofing panels, or siding panels. Flexible rim 15 of extended shelf 14 is arranged to be bent or formed to create ridge 16 in flexible rim 15 (discussed further infra) to ensure flush contact of extended shelf 14 atop shingles 200, 201, 202 across roof shingle seam 210. As shown in FIG. 1, roof shingle 201 overlaps roof shingles 200 and 202, creating seam 210 that creates a vertical height difference between the higher shingle 201 and the lower shingles 200 and 202. Flexible rim 15 allows extending shelf 14 to form ridge 16 in a configuration that maintains flush contact with roof shingles 200, 201, and 200, sealing flexible casing 11 from external weather, e.g., snow or rain, that may damage electrical conduit or the roof where the conduit passes through. It should also be appreciated that flexible rim 15 may also be bent or formed in a downward direction to create a protrusion that would fit between roof shingle gap 220 created by shingles 200 and 201.

Figure 2:
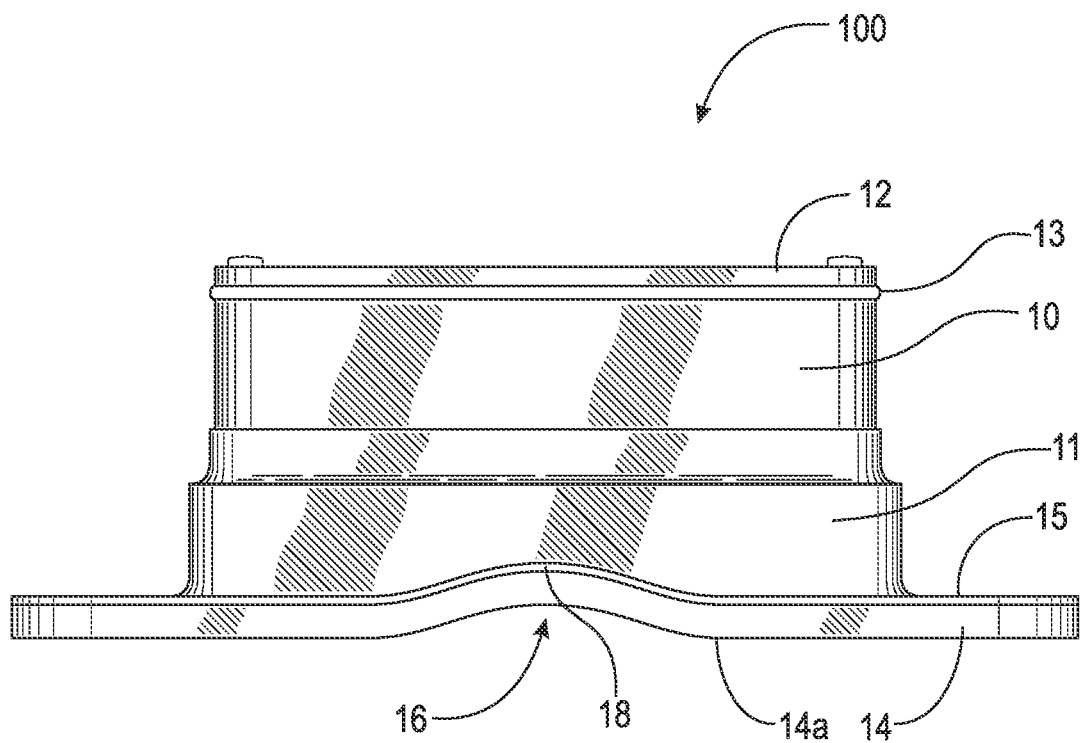
FIG. 2 is a front side view of the invention shown in FIG. 1.

FIG. 2 illustrates a front side view of a first embodiment of the present invention. Junction box 100 includes ridge 16 of extended shelf 14 and ridge 18 of flexible rim 15. A bend in flexible rim 15 creates ridge 18 that results in ridge 16 on extended shelf 14 on bottom surface 14a of extended shelf 14. Ridges 16 and 18 allow for a flush fit atop a seam or gap between roofing members as shown in FIG. 1. Also shown in FIG. 2 is seal 13 that is arranged to provide a weather resistant seal between cover 12 and housing 10 (discussed further infra). It should be appreciated that, although seal 13 in the present embodiment is a separate component of junction box 100, it may be integral with housing 10 or with cover 12.

Figure 3:
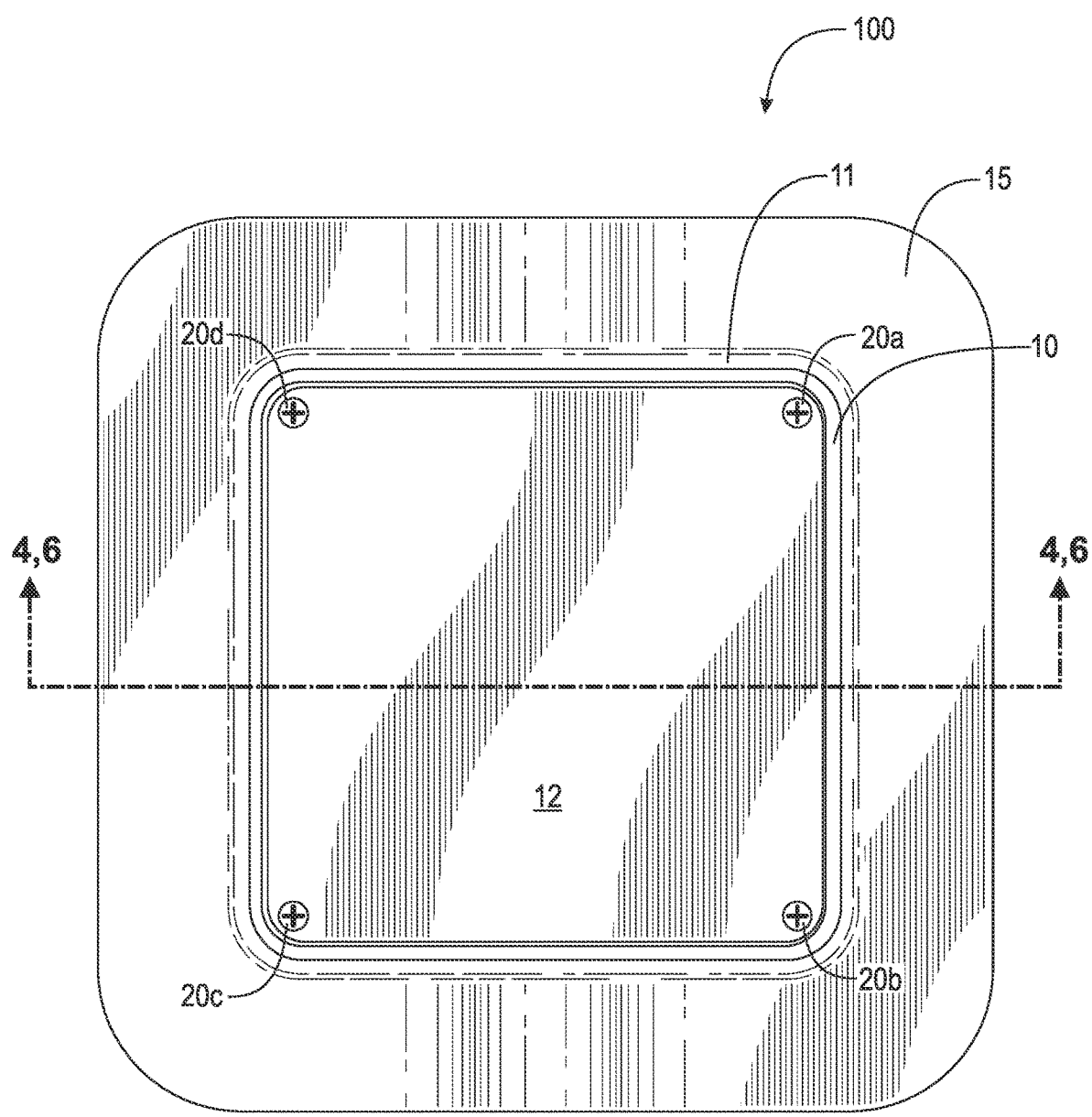
FIG. 3 is a top view of the invention shown in FIG. 1.

FIG. 3 illustrates a top view of the first embodiment of the present invention. Cover 12 is secured to housing 10 by screws 20a-20d. Cover 12 may also be secured by other means, such as a snap-fit, to reduce the additional hardware needed to assembly junction box 100. Flexible rim 15 is shown as a substantially square shape having rounded corners with a center aperture (shown in FIG. 5), and may be adjustable in shape or size to accommodate different shapes or sizes of extended shelf 14 (not shown in FIG. 3) of flexible casing 11.

Figure 4:
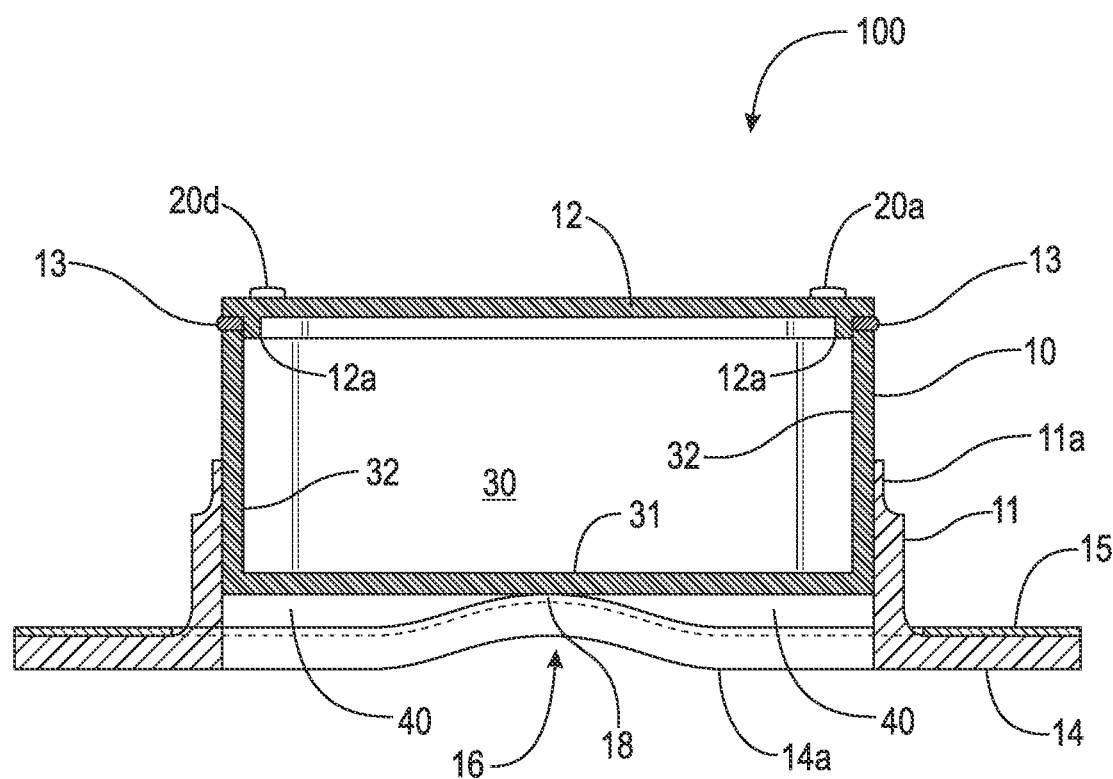
FIG. 4 is a sectional view of the invention shown in FIG. 1, taken generally along lines 4-4 in FIG. 3.

FIG. 4 illustrates a sectional view taken generally along lines 4-4 in FIG. 3 of the first embodiment of the present invention. Housing 10 comprises walls 32 and base 31 that form interior 30 of housing 10. Cover 12 of junction box 100 includes internal ridge 12a on its bottom surface. Internal ridge 12a creates an outer channel that is arranged to accept seal 13 on its bottom surface. Internal ridge 12a is configured to have an outer diameter that is equal to the inner diameter of walls 32 to fit within housing 10. The outer surface of walls 32 and the outer surface of base 31 of housing 10 are arranged to snuggly fit within aperture 40 of flexible casing 11. Lip 11a of flexible casing 11 is the preferably of the same material as flexible casing. Lip 11a has an inner diameter than is less than the outer diameter of housing 11 thereby increasing the frictional grip of flexible casing on housing 11.

As shown in FIG. 4, housing 11 is not fully inserted into aperture 40 when junction box 100 is fully assembled and installed. The bottom surface of base 31 of housing 11 is parallel with bottom surface 14a of extended shelf 14, not coplanar. The distance between the bottom surface of base 31 and the bottom surface 14a of extended shelf 14 is such that when flexible rim 15 is formed to have ridge 18, and when extended shelf 14 subsequently has ridge 16, a raised seam between roofing shingles (shown in FIG. 1) will not contact the bottom surface of base 31. It should be appreciated that the distance between bottom surface of base 31 of housing 11 and bottom surface 14a of extended shelf 14 may be any acceptable length so long as bottom surface 14a is in flush contact atop roof shingles and a roof shingle seam when junction box 100 is engaged to a roof. It should also be appreciated that base 31 of housing 10 is arranged to be user-drilled to contain at least one through-bore in order to accommodate electrical conduit, and other electrical components necessary to support roof accessories, such as connections to a solar panel, that may be housed within interior 30 of housing 10.

Figure 5:
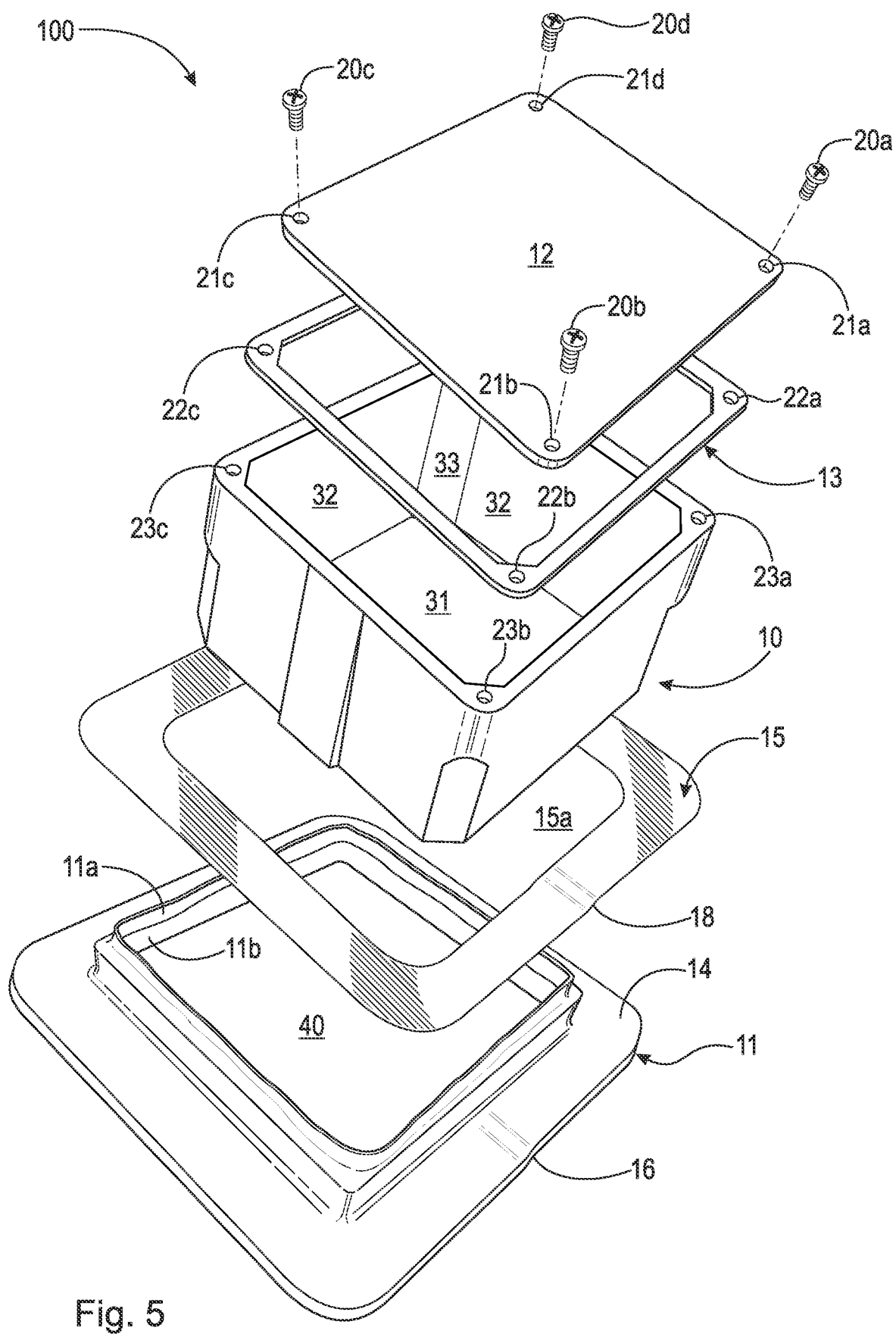
FIG. 5 is a perspective exploded view of the invention shown in FIG. 1; and, FIG. 6 is a sectional view of an alternative embodiment of the present invention shown in FIG. 1, taken generally along lines 4-4 in FIG. 3.

FIG. 5 illustrates an exploded perspective view of the first embodiment of the present invention. Cover 12 includes four (4) apertures 21a-21d that are arranged to accept four (4) screws 20a-20d. Seal 13 is additionally secured to cover 12 via apertures 22a-22d that are arranged to accept four (4) screws 20a-20d. Seal 13 is sandwiched between cover 12 and the top edge of walls 32 and corners 33 of housing 10. Cover 12 and seal 13 are secured to housing 10 via screws 20a-20d that threadably engaging apertures 23a-23d. Apertures 23a-23d may be threaded or may use another securing method such as a snap fit, thusly screws 20a-20d may be pins arranged to secure to apertures 23a-23d. Flexible rim 15 is fixedly secured to extended shoulder 14, via an adhesive, or any other acceptable securing means such that rim 15 will not be removeable from shoulder 14 of flexible casing 14. Base wall 11b is comprised of four continuous walls, and, in combination with lip 11a, comprises flexible casing 11. Lip 11a and base walls 11b of flexible casing 11 are arranged to fit aperture 15a of flexible rim 15. Lip 11a and base walls 11b of flexible casing 11 are further arranged to frictionally grip and hold the outer surface of walls 32 and corners 33 of housing 10 within aperture 40 of flexible casing 11.

Figure 6:
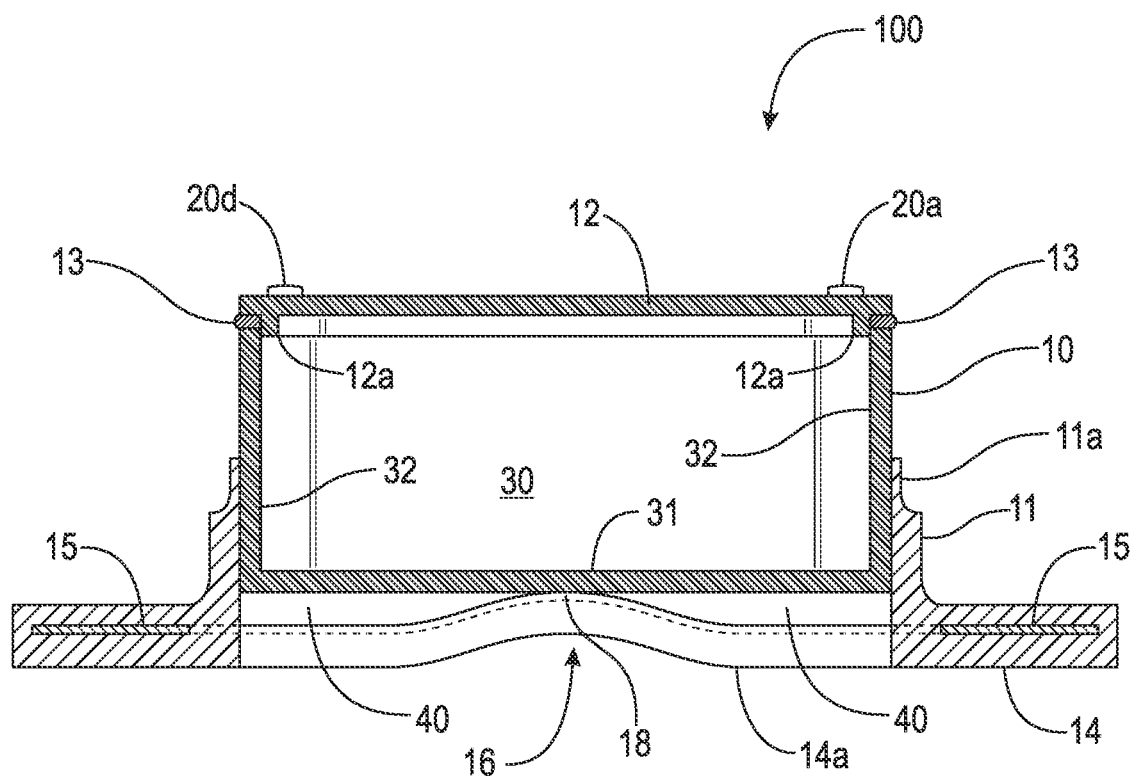

FIG. 6 illustrates a sectional view of the second embodiment of the present invention taken generally along lines 6-6 in FIG. 3. It should be appreciated that the differences between the first embodiment and the second embodiment are only in respect to the configuration of flexible rim 15 and extended shoulder 14, and the aforementioned description of FIGS. 1-5 applies to the second embodiment of the present invention shown in FIG. 6. Junction box 100 in an alternative embodiment includes flexible rim 15 embedded within extended shoulder 14 of flexible casing 11. In view of weather that a secured junction box on a roof will experience, embedding flexible rim 15 protects the material from weather changes. Additionally, embedding rim 15 within shoulder 14 also prevents possible safety concerns whereas an improperly secured rim 15 may possibly be snagged by a user installing junction box 100. Embedding rim 15 within shoulder 14 also increases the general weather durability of the present invention.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS 10 housing
11 flexible casing
11a lip of flexible casing 11
11b base walls of flexible casing 11
12 cover
12a internal ridge of cover 12
13 seal of cover 12
14 extended shelf of flexible casing 11
14a bottom surface of extended shelf 14
15 flexible rim of flexible casing 11
16 ridge of extended shelf 14
18 ridge of flexible rim 15
20a first screw
20b second screw
20c third screw
20d fourth screw
21a first aperture of cover 12
21b second aperture of cover 12
21c third aperture of cover 12
21d fourth aperture of cover 12
22a first aperture of seal 13
22b second aperture of seal 13
22c third aperture of seal 13
22d fourth aperture of seal 13
23a first aperture of housing 10
23b second aperture of housing 10
23c third aperture of housing 10
23d fourth aperture of housing 10
30 interior of housing 10
31 base of housing 10
32 internal walls of housing 10
33 internal corners of housing 10
40 aperture of flexible casing 11
100 junction box
200 roof shingle
201 roof shingle
202 roof shingle
210 roof shingle seam
220 roof shingle gap

What is claimed is:

1. A junction box, comprising:
   a waterproof housing, said housing having an open top and a closed bottom, said housing having a cover, said cover arranged to secure to said open top of said housing;
   a flexible casing having four side members arranged to frictionally accept housing therein, thereby sealably surrounding said housing;
   an outwardly extending shelf fixedly secured to an outside surface of said four side members of said flexible casing; and,
   a flexible rim fixedly secured to a top surface of said shelf, said flexible rim arranged to be bent and thereby imparting at least one structural formation on said shelf, wherein said structural formation is adjustable according to a structural formation of a roof that said flexible casing is placed thereon.

2. The junction box recited in claim 1, wherein said structural formation imparted on said shelf by said flexible rim comprises at least one channel.

3. The junction box recited in claim 2, wherein said channel is substantially V-shaped.

4. The junction box recited in claim 1, wherein said structural formation imparted on said shelf by said flexible rim comprises at least one protrusion.

5. The junction box recited in claim 1, wherein said structural formation imparted on said shelf by said flexible rim comprises at least one of: a channel; and, a protrusion.

6. The junction box recited in claim 1, wherein said structural formation imparted on said shelf by said flexible rim comprises a channel and a protrusion.

7. The junction box recited in claim 1, wherein said cover is arranged to sandwich a seal between said housing and said cover when said cover is secured to said housing.

8. The junction box recited in claim 1 wherein said flexible casing and said outwardly extending shelf are a singular piece.

9. The junction box recited in claim 8 wherein said flexible casing and said outwardly extending shelf are made of rubber.

10. The junction box recited in claim 1 wherein said flexible casing and said outwardly extending shelf are made of rubber.

11. The junction box recited in claim 1 wherein said flexible rim is deformable, said flexible rim is further arranged to form at least one ridge on said shelf.

12. The junction box recited in claim 1 wherein said flexible rim is malleable.

13. The junction box recited in claim 1 wherein said flexible rim is made of aluminum.

14. The junction box recited in claim 1 wherein said closed bottom of said housing is arranged to be through-bored to accept electrical conduit.

* * * * *